(12) United States Patent
Mori et al.

(10) Patent No.: US 6,215,959 B1
(45) Date of Patent: *Apr. 10, 2001

(54) CAMERA HAVING AUTOFOCUS FUNCTION INDEPENDENT OF PHOTOGRAPHING OPTICAL SYSTEM

(75) Inventors: Akira Mori, Kawasaki; Atsujiro Ishii, Houya; Masahiro Suzuki, Hachioji; Hironori Shibata, Mobara, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/136,291

(22) Filed: Aug. 19, 1998

Related U.S. Application Data (63) Continuation of application No. 08/715,620, filed on Sep. 18, 1996, now Pat. No. 5,815,747.

(30) Foreign Application Priority Data

Dec. 28, 1995 (JP) ..................................................... 7-343268

(51) Int. Cl.⁷ .............................. G03B 13/22; G03B 3/00
(52) U.S. Cl. ............................................................. 396/91
(58) Field of Search ........................ 396/91, 92, 138–139, 396/121, 80

(56) References Cited

U.S. PATENT DOCUMENTS

| 4,483,613 | 11/1984 | Yokota . |
|---|---|---|
| 4,707,103 | 11/1987 | Ikemori et al. . |
| 4,828,383 | 5/1989 | Kunishige et al. . |
| 4,857,718 | 8/1989 | Karasaki et al. . |
| 4,907,026 | 3/1990 | Koyama et al. . |
| 4,982,216 | 1/1991 | Kudo et al. . |
| 5,083,149 | 1/1992 | Kudo et al. . |
| 5,233,173 | 8/1993 | Moriyama . |
| 5,233,382 | 8/1993 | Taniguchi et al. . |
| 5,257,062 | 10/1993 | Moriyama . |
| 5,262,819 | 11/1993 | Ohtaka et al. . |
| 5,442,481 | 8/1995 | Hasushita . |
| 5,815,747 | * 9/1998 | Mori et al. .............................. 396/91 |

FOREIGN PATENT DOCUMENTS 6-90356   11/1994   (JP) .

* cited by examiner

Primary Examiner—Christopher E. Mahoney
(74) Attorney, Agent, or Firm—Pillsbury Winthrop LLP

(57) ABSTRACT

A camera having an autofocus function, independent of a photographing optical system, includes a photographing optical system including synthetic resin lenses and an autofocus optical system, provided independent of the photographing optical system, having at least one synthetic resin lens and a stop decentered in a direction perpendicular to the optical axis of the synthetic resin lens. Thus, in the camera, the shift of the imaging position of the photographing optical system which is caused by an ambient temperature or humidity change is favorably corrected, and good photography can be performed.

17 Claims, 8 Drawing Sheets

CAMERA HAVING AUTOFOCUS FUNCTION INDEPENDENT OF PHOTOGRAPHING OPTICAL SYSTEM

PRIOR APPLICATION

This application is a continuation of Application No. 08/715,620 filed Sep. 18, 1996, now U.S. Pat. No. 5,815,747, which claimed priority from, as does this application, Japanese Application No. 7-343268 filed in Japan on Dec. 28, 1995, the contents of both applications being incorporated hereinto by references.

BACKGROUND OF THE INVENTION

1. Field of the Invention

This invention relates to a camera having an autofocus function, independent of a photographing optical system, which includes optical elements using synthetic resin as material.

2. Description of Related Art

Synthetic resin is less expensive than glass and is easy to shape. Thus, the use of such synthetic resin facilitates the configuration of an aspherical lens and the improvement of imaging performance of an optical system. In recent years, optical apparatuses, such as cameras, have been required, to have an imaging optical system that includes optical elements which are constructed of synthetic resin having such excellent features. The optical elements constructed of synthetic resin are available in a single lens type in which a lens element is used alone and a compound lens type in which a lens element comes in close contact with a glass lens. However, the optical element constructed of synthetic resin, has particularly the defect that its imaging position is shifted.

In order to meet this problem, a technique is known that a change in temperature is determined by variation in electric resistance and thereby the shift of the imaging position is corrected. Another technique is also known that the shift of the imaging position caused by a temperature or humidity change is controlled by a lens design in such la way that the refracting power of a synthetic resin lens is lessened or at least two synthetic resin lenses are used and their refracting powers are set to minimize the shift of the imaging position caused by the temperature or humidity change in the entire optical system.

Further, a so-called TTL type focus detecting system is available in which a beam of light coming from an object, after passing through an Imaging optical system, is made incident on a light-receiving element, and thereby the imaging position is detected, together with the shift of the imaging position due to the temperature or humidity change.

A focus detecting system that is provided such that it is independent of the photographing optical system, on the other hand, as proposed by Japanese Patent Publication No. Hei 6-90356, is such that the defect that the imaging position is shifted by the temperature change is obviated by placing a member which expands or contracts according to temperature in a focus detecting device to produce variation in range measurement.

The first technique, mentioned above, of determining the change of temperature or humidity by the variation of electric resistance to thereby correct the shift of the imaging position has the following problems. Since the time required for the change of the shape or refractive index of the synthetic resin lens is greater than that required for the change of ambient temperature or humidity, it is difficult to measure only the ambient temperature or humidity to thereby predict the shift of the imaging position with accuracy. Moreover, there is no means which can be incorporated in a camera to measure the change of Humidity easily and inexpensively, and thus the change of humidity cannot be accurately followed. Consequently, it has been Impossible that means for measuring the change of humidity is incorporated in the camera to correct the shift of the imaging position caused by the change of humidity.

The second technique of minimizing the shift of the imaging position caused by the temperature or humidity change in the lens design involves the following problems. If the lens design is made to minimize the shift of the imaging position caused by the temperature or humidity change, the degree of freedom for setting the refractive index of the synthetic resin lens will be eliminated and an effective design cannot be prepared. For systems with at least two synthetic resin lenses, two kinds of synthetic resin are in general use to correct for chromatic aberration. In this case, however, the reaction of synthetic resin to the change of temperature or humidity varies with the kind of synthetic resin used for the lenses, and thus it cannot be ensured that the shift of the imaging position by the temperature or humidity change is always suppressed.

A general property of a lens constructed of synthetic resin is that the lens is liable to undergo the influence of a change in temperature. When the temperature is raised, for example, the radius of curvature and thickness of the lens are increased and the refractive index thereof is decreased. On the other hand, the influence of a change in humidity on the lens cannot also be neglected. For example, a in humidity rise causes the radius of curvature and thickness of the lens to be increased and the refractive index thereof to be also increased.

With the lens constructed of such synthetic resin, it is therefore difficult to ensure that the shift of the Imaging position caused by either the temperature or humidity change is kept to a minimum.

The TTL type focus detecting system, by contrast, allows the above problems to be solved. This system, however, makes use of a beam of light from an object, and thus requires circuits for performing a high grade of signal processing because the amount of light emanating from the object and its distribution change with objects, such as flowers, persons, and backgrounds. Moreover, system requires, to make two images coincide as a focusing mechanism, the system requires two light-receiving element arrays, two reimaging optical systems, and a complicated signal processing system for determining whether the two images coincide, and path splitting or switching means for splitting light from the photographing optical system to introduce the light into the reimaging optical systems. Thus, the TTL system, because of its many parts, has the disadvantages that the manufacturing costs are high and the camera body is bulky. Furthermore, since the system requires an image equivalent to that formed on a film, it is difficult to apply the system to the so-called lens shutter camera in which an aperture stop and a shutter are integrally constructed. That is, the system, although applicable to a single-lens reflex camera, is unsuitable for the lens shutter camera which is inexpensive and compact.

There is an example which is applicable to the lens shutter type, as the camera disclosed in Hei 6-90356 mentioned above, but this proposal encounters the problems that (1) accommodation for the humidity change is impossible, (2) the degree of freedom for optical design is not obtained, and (3) accommodation for a change with the passage of time is Impossible (where two or more kinds of materials are in particular used in the photographing optical system).

SUMMARY OF THE INVENTION

It is, therefore, a primary object of the present invention to provide a camera having: a photographing optical system including synthetic resin lenses; and an autofocus function (autofocus optical system), which is independent of the photographing optical system, in which good photography can be performed even though the shift of the imaging position is caused by changes in shape and refractive index of each synthetic resin lens of the photographing optical system involved in an ambient temperature or humidity change.

It is another object of the present invention to provide a camera having: a photographing optical system including synthetic resin lenses and possessing a variable magnification function; and an autofocus optical system, provided such that it is independent of the photographing optical system, in which even though the shift of a imaging position is caused by changes in shape and refractive index of each synthetic resin lens of the photographing optical system involved in an ambient temperature or humidity change, good photography can be performed.

It is still another object of the present invention to provide a camera having: a photographing optical system including two or more kinds of synthetic resin lenses; and a passive autofocus optical system which is provided to be independent of the photographing optical system, in which, even though the shift of the imaging position is caused by changes in shape and refractive index of each synthetic resin lens of the photographing optical system involved in an ambient temperature or humidity change, good photography can be performed.

It is a further object of the present invention to provide a camera having: a photographing optical system including two or more kinds of synthetic resin lenses; and an active autofocus optical system which is provided to be independent of the photographing optical system, in which, even though the shift of the imaging position is caused by changes in shape and refractive index of each synthetic resin lens of the photographing optical system involved in an ambient temperature or humidity change, good photography can be performed.

It is still a further object of the present invention to provide a camera having: a photographing optical system including synthetic resin lenses to which coatings are applied; and an autofocus optical system which is provided to be independent of the photographing optical system, in which, even though the shift of the imaging position is caused in the photographing optical system by an ambient humidity change, good photography can be performed.

It is yet a further object of the present invention to provide a camera having: a photographing optical system including synthetic resin lenses; and a passive autofocus optical system which is provided to be independent of the photographing optical system, in which, even though the shift of the imaging position is caused by changes in shape and refractive index of each synthetic resin lens of the photographing optical system involved in an ambient temperature or humidity change, good photography can tie performed.

In order to achieve these objects, according to one aspect of the present invention, the camera having the autofocus function independent of the photographing optical system comprises: a photographing optical system including synthetic resin lenses; and an autofocus optical system which is provided to be independent of the photographing optical system, including at least one synthetic resin lens and a stop decentered in a direction normal to the optical axis of this synthetic resin lens.

According to another aspect of the present invention, the photographing optical system is provided with a variable magnification function.

According to another aspect of the present invention, the photographing optical system is provided with a variable magnification function, and the relative positions of the synthetic resin lens and the stop constituting the autofocus optical system which is independent of the photographing optical system can be changed in association with the variable magnification behavior of the photographing optical system.

According to another aspect of the present invention, the photographing optical system has at least two kinds of synthetic resin lenses, and the autofocus optical system provided independent of the photographing optical system which is is constructed with a passive autofocus optical system whose bilateral optical system has lenses of different materials on both sides.

According to another aspect of the present invention, the photographing optical system has at least two kinds of synthetic resin lenses, and the autofocus optical system which is provided to be independent of the photographing optical system is constructed with an active autofocus optical system whose reception optical system has at least two kinds of synthetic resin lenses.

According to another aspect of the present invention, coatings are applied to the surfaces of the synthetic resin lenses that are included in the photographing optical system which are and the autofocus optical system provided to be independent of the photographing optical system.

According to another aspect of the present invention, the autofocus optical system which is provided to be independent of the photographing optical system is constructed with a passive autofocus optical system whose bilateral reception optical system has a synthetic resin lens on each side, and a stop is aligned with the synthetic resin lens on either side of the bilateral reception optical system.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, it will be expedient to explain the general construction and function of the camera having an autofocus function which is independent of the photographing optical system according to the present invention.

The camera, according to the present invention, comprises: a photographing optical system including a synthetic resin lens unit; and an autofocus optical system, which is provided to be independent of the photographing optical system, including a synthetic resin lens unit and a stop decentered in a direction perpendicular to the optical axis of this synthetic resin lens unit. The camera is designed so that a beam of light from an object is transmitted through the autofocus optical system and is received by a light-receiving element, and has the function of correcting, on the basis of the output of the light-receiving element, the shift of the Imaging position of the photographing optical system caused by an ambient temperature or humidity change.

Figure 1:
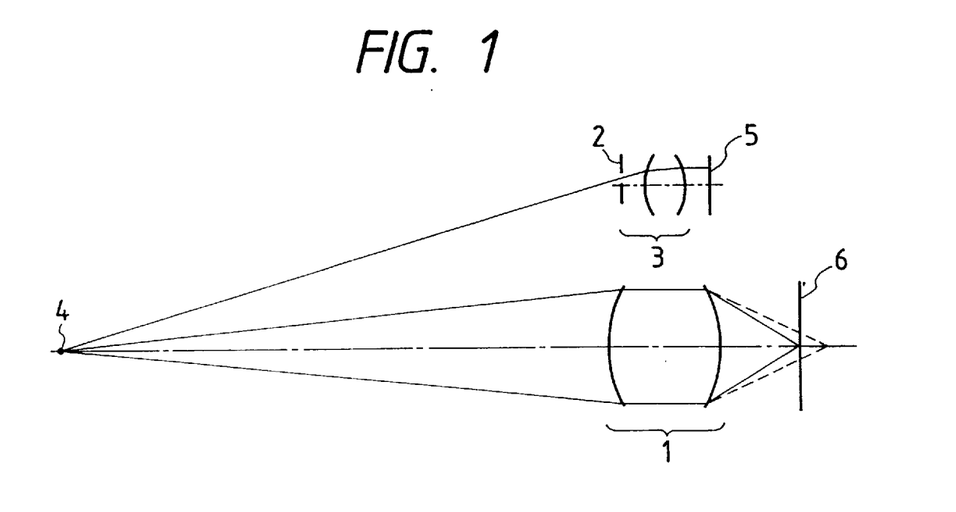
FIG. 1 is a conceptual view showing an optical arrangement of the camera according to the present invention.

The camera of the present invention, as shown in FIG. 1, is equipped with a photographing optical system 1 which includes a synthetic resin lens, and an autofocus optical system having a reception optical system 3 which includes a synthetic resin lens and a stop 2 decentered in a direction normal to the optical axis of this synthetic resin lens. The reception optical system 3 possesses the same property as in the photographing optical system 1 with respect to a temperature or humidity change. Thus, in the camera of the present invention, the shift of the imaging position of the photographing optical system 1 can be detected in the reception optical system 3.

Figure 2:
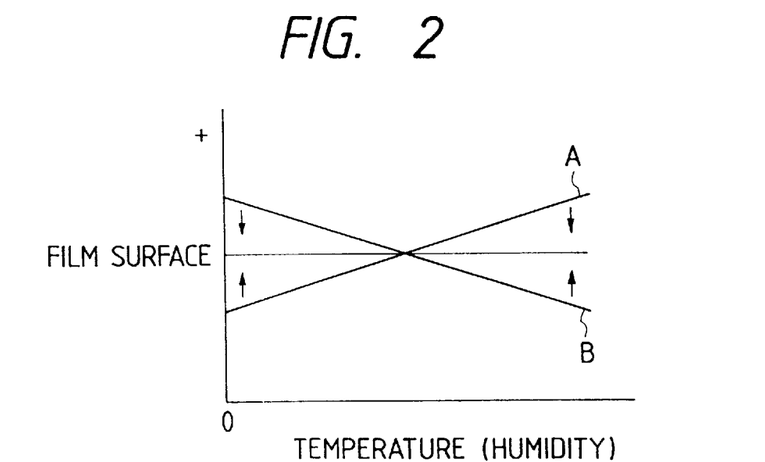
FIG. 2 is a graph for explaining the shift of an imaging position caused by an ambient temperature or humidity change in the photographing optical system of the camera equipped with a synthetic resin lens.

The imaging position of the photographing optical system 1 which includes the synthetic resin lens, as indicated by a straight line A of the graph shown in FIG. 2, varies according to the temperature or humidity change. Thus, in the case where the temperature or humidity change is brought about, if the shift of the imaging position of the photographing optical system 1 is corrected by values indicated by a straight line B of the graph, an image will be formed at a constant position, irrespective of ambient temperature or humidity, and favorable photography becomes possible.

In this way, the camera of the present invention is such that the amount of variation of the imaging position relating to the temperature or humidity change of the photographing optical system 1 is detected by the reception optical system having the same property of temperature or humidity as in the photographing optical system 1, and thereby the shift of the imaging position of the photographing optical system 1 is corrected. In the camera of the present invention, the stop 2 is placed so that its aperture is decentered in a direction perpendicular to the optical axis of the reception optical system. Hence, for the angle of incidence of a ray of light which emanates from an object 4 constituting a subject for range measurement and is incident through the center of the stop 2 (aperture) on the reception optical system 3, the angle of emergence of the ray passing through the center of the stop 2 and the reception optical system 3 and emerging from the reception optical system 3 toward a light-receiving element 5 varies according to the temperature or humidity change of the reception optical system 3. The amount of this variation is thus detected by the shift off the position of incidence of the ray on the light-receiving element 5. Consequently, the shift of the imaging position relative to an image plane 6 of the photographing optical system 1 is thus corrected on the basis of information detected at the light-receiving element 5, and thereby good photography can be performed.

In the present invention, as mentioned above, the shift of the imaging position relative to the image plane 6 of the photographing optical system 1 can be corrected in response to the change of the reception optical system 3 itself of the autofocus optical system, and thus the following effects are brought about: (1) For the technique of using a thermometer to correct the shift of the imaging position of the photographing optical system, the shift of the imaging position due to the humidity change can also be considered. (2) Compared with the technique of correcting the shift of the imaging position of the photographing optical system by the design of optical elements, the number of degrees of freedom of the design of optical elements is increased to facilitate an optical design for high performance, optimum specification, and low cost, and the difference between the influences of the ambient temperature and humidity on the photographing optical system need not be considered in particular for design because the influences of the temperature and humidity are both evaluated.

Furthermore, in the camera of the present invention, a member for changing the angle of refraction, such as a variable-angle prism, is disposed in the reception optical system 3 of the autofocus optical system, thereby allowing the shift of the imaging position of the photographing optical system 1 to be corrected more favorably.

Where an active autofocus optical system is adopted in the autofocus optical system used in the camera of the present invention, the same effect as in the above description is secured even when the variable-angle prism is placed in either one of projection and reception optical systems. In this case, however, the placement of the variable-angle prism on the reception side is more advantageous because variation in visual field is limited. Where a passive autofocus optical system is adopted, on the other hand, the variable-angle prism may be placed on each side of its bilateral optical system or on only one side thereof.

According to the present invention, the camera comprises: a photographing optical system including synthetic resin lenses and having a variable magnification function; and an autofocus optical system which is provided to be independent of the photographing optical system, including a synthetic resin lens and a stop decentered in a direction perpendicular to the optical axis of this synthetic resin lens. The camera is designed so that a beam of light from an object is transmitted through the autofocus optical system and is received by a light-receiving element and has the function of correcting, on the basis of the output of the light-receiving element, the shift of the imaging position of the photographing optical system caused by a temperature or humidity change or by variable magnification behavior based on the output of the light-receiving element.

The camera, although its specific function and effect are the same as in the above description, is designed so that, in order to correct the shift of the imaging position in a zoomed in state of the photographic optical system, the output of the autofocus optical system is adjusted to the shift of the imaging position on the telephoto side of the photographing optical system. It is for this reason that the influence of the temperature or humidity change on the shift of the imaging position of the photographing optical system is less prevalent on the wide-angle side on which the depth of field is larger than on the telephoto side, and the adjustment of the output to the shift of the imaging position on the telephoto side makes it possible to address, to some extent, the problem of the shift of the imaging position on the wide-angle side. For another technique, synthetic resin lenses are used in only the front lens unit of the photographing optical system (where focusing is performed by the front lens unit), and thereby the same effect can be brought about. This is because the amount of focus adjustment to a distance, as in two-lens-unit zoom, becomes constant, irrespective of the focal length, in the range from the wide-angle position to the telephoto position. Such an arrangement allows the shift of the imaging position of the photographing optical system to be corrected in a simple way, and has a cost advantage.

According to the present invention, the camera comprises: a photographing optical system including synthetic resin lenses and having a variable magnification function; and an autofocus optical system which is provided to be independent of the photographing optical system, including a synthetic resin lens and a stop decentered in a direction normal to the optical axis of this synthetic resin lens and provided with a variable magnification function. The camera is designed so that a beam of light from an object is transmitted through the autofocus optical system and is received by a light-receiving element, and has the function of correcting, on the basis of the output of the light-receiving element, the shift of the Imaging position of the photographing optical system caused by a temperature or humidity change or by variable magnification behavior.

The camera is such that, for example, a variable-angle prism is used in the autofocus optical system and is associated with the variable magnification behavior in a zoom state, or the autofocus optical system itself is constructed with a zoom lens, or the stop of the autofocus optical system can be mechanically driven in association with a zoom state of the photographing optical system.

Thus, when the camera is constructed as mentioned above, the shift of the imaging position of the photographing optical system can be corrected over the whole range from the wide-angle position to the telephoto position.

According to the present invention, the camera comprises: a photographing optical system having at least two kinds of synthetic resin lenses; and an autofocus optical system which is provided to be independent of the photographing optical system, including a synthetic resin lens and a stop decentered in a direction normal to the optical axis of this synthetic resin lens. The autofocus optical system which is provided to be independent of the photographing optical system is composed of a passive autofocus optical system whose bilateral optical system has lenses of different materials on both sides. Beams of light from an object are transmitted through the bilateral optical system of the passive autofocus optical system and are received by light-receiving elements provided in the bilateral optical system. The camera thus has the function of correcting, on the basis of the outputs of the light-receiving elements, the shift of the imaging position of the photographing optical system caused by a humidity or temperature change.

In general, where at least two kinds of synthetic resin lenses are used in the photographing optical system, a change with the passage of time of the imaging position caused by an ambient temperature or humidity change becomes infrequently uniform. This is because individual synthetic resin lenses are different in property of temperature or hygroscopicity. For a change of refractive index with a rise in temperature, for example, acrylic resin and polycarbonate resin are almost the same, while for a change of refractive index by with a rise, in humidity acrylic resin is greater, and they are considerably different in hygroscopic rate. More specifically, in common photographic lenses, it is, ideally, favorable that all the lenses are constructed of the same material and a change with the passage of time of the imaging position caused by a temperature or humidity change is uniform. In practice, however, use is often made of a material with a large Abbe's number (for example, acrylic resin) for a positive lens and a material with a smaller Abbe's number (for example, polycarbonate resin) for a negative lens. Even with such construction, the shifts of focal lengths of the positive and negative lenses by the temperature or humidity change cannot be offset, and thus the change with the passage of time of the imaging position of the photographing optical system does not become uniform. In order to meet this problem, the previously-mentioned construction is adopted in the present invention, but it is a matter of course that the lens material is not limited to only one kind so that the lenses of different materials are used in the bilateral reception optical system of the passive autofocus optical system, and various kinds of lens materials may be used in accordance with the properties of the photographing optical system.

According to the present invention, the camera comprises: a photographing optical system having at least two kinds of synthetic resin lenses; and an autofocus optical system which be provided to be independent of the photographing optical system, including a synthetic resin lens and a stop decentered in a direction perpendicular to the optical axis of this synthetic resin lens. The autofocus optical system which is provided to be independent of the photographing optical system is composed of an active autofocus optical system having at least two synthetic resin lenses, and a beam of light from an object are transmitted through the reception optical system of the active autofocus optical system and is received by a light-receiving element. The camera thus has the function of correcting, on the basis of the output of the light-receiving element, the shift of the imaging position of the photographing optical system caused by a humidity or temperature change.

Since, in general, the photographing optical system using at least two kinds of synthetic resin lenses has the features as mentioned above, the active autofocus optical arc system adopts the construction described in the foregoing, thereby meeting the problem of the change with the passage of time of the Imaging position, due to the temperature or humidity change, of the photographing optical system. Moreover, as a matter of course, a plurality of lenses of different materials may be arranged in the reception optical system of the active autofocus optical system in accordance with, the properties of the photographing optical system.

According to the present invention, the camera comprises: a photographing optical system having synthetic resin lenses to which coatings are applied; and an autofocus optical system, provided independent of the photographing optical system, including a synthetic resin lens to which a coating is applied and a stop decentered in a direction perpendicular to the optical axis of this synthetic resin lens. The camera thus has the function of correcting the shift of the imaging position, due to the temperature or humidity change, of the photographing optical system.

If each of the synthetic resin lenses arranged in the photographing optical system has the coating, while the lens disposed in the autofocus optical system has no coating, the hygroscopic properties of both optical systems will vary. This is because in the former optical system, incident light is blocked by the coating and the hygroscopic rate becomes low, whereas in the latter, no light is blocked and the hygroscopic rate becomes higher. In order to address this problem, it is only necessary to apply the coating to the synthetic resin lens disposed in the autofocus optical system as in the photographing optical system. In doing so, the object of the present: invention can be successfully achieved with ease and at low cost.

According to the present invention, the camera comprises: a photographing optical system including synthetic resin lenses; and a passive autofocus optical system which is provided to be independent of the photographing optical system, including synthetic resin lenses and stops. The passive autofocus optical system is designed so that one of the stops of the bilateral reception optical system of the passive autofocus optical system is decentered in a direction normal to the optical axis of the synthetic resin lens, and the other is not decentered with respect to the synthetic resin lens. Beams of light from an object are transmitted through the bilateral reception optical system of the passive autofocus optical system and are received by light-receiving elements of the bilateral reception optical system. The camera thus has the function of correcting the shift of the imaging position, due to the temperature or humidity change, of the photographing optical system, based on the difference between the outputs of the light-receiving elements.

The fundamental function and effect of the camera thus constructed are as mentioned above, and since it is only necessary to fill, with respect to only one side of the bilateral reception optical system, demands from a camera system that, for example, the stop and the optical element constituting the autofocus optical system are driven and treatment required for the autofocus optical system is carried out, this construction is more advantageous to the accuracy and cost of the optical system.

In accordance with the embodiments shown in the drawings, the present invention will be explained in detail below.

First embodiment

Figure 3:
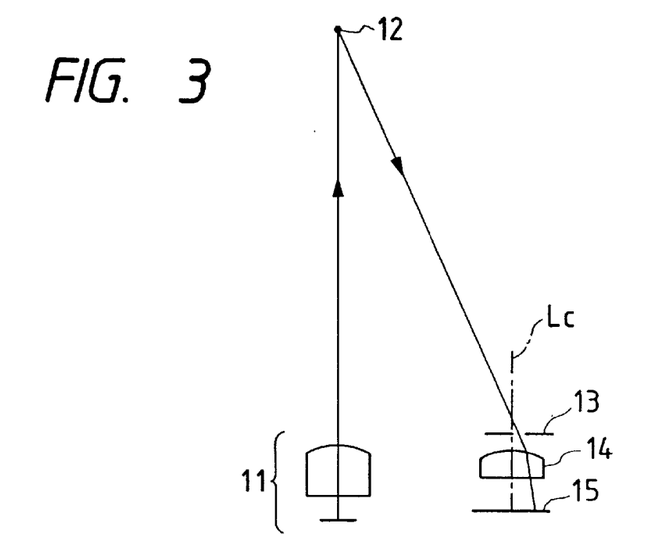
FIG. 3 is a conceptual view showing the arrangement of an autofocus optical system mounted in the camera of a first embodiment in the present invention.

This embodiment shows an example of the camera mounting an active autofocus optical system. In the camera, as shown in FIG. 3, a beam of light emitted from a projecting section 11 is first radiated toward an object point 12. Subsequently, reflected light from the object point 12, after passing through the aperture of a stop 13, is transmitted through a reception lens 14 and is radiates on a light-receiving element 15. In this case, the aperture of the stop 13 is decentered with respect to an optical axis Lc of the reception lens 14 in a direction perpendicular to the optical axis Lc. The reception lens 14 is constructed of synthetic resin and a photographing optical system, not shown, has lenses of the same synthetic resin. Hence, the photographing optical system possesses temperature or humidity properties identical with the reception lens 14.

Since the camera of the first embodiment is constructed as in the foregoing, a change produced in the photographing optical system by an ambient temperature or humidity change is likewise brought about in the autofocus optical system. Consequently, in the autofocus optical system, the shift of the imaging position, caused by the ambient temperature or humidity change, of the photographing optical system can be detected.

Specifically, the camera of the first embodiment is such that, for the angle of incidence of a ray of light from the object point 12 through the center of the aperture of the stop 13 on the reception lens 14, the angle of emergence of the ray passing through the center of the aperture of the stop 13 and the reception lens 14 and emerging from the reception lens 14 toward the light-receiving element 15 varies according to the ambient temperature or humidity change, and thus the position of the ray incident on the light-receiving element 15 also varies. In accordance with the amount of variation of the position of the incident ray which is detected at the light-receiving element 15, the amount of, variation of the imaging position of the photographing optical system is detected. In this way, by correcting the shift of the imaging position of the photographing optical system, good photography becomes possible.

Where the photographing optical system has a zoom function and is such that the imaging position on the wide-angle side is different from that on the telephoto side, the amount of eccentricity of the stop 13 is changed in the range from the wide-angle side to the telephoto side so that the amount of variation of data for range measurement can be held with accuracy. By doing so, it becomes possible to solve this problem.

Second Embodiment

Figure 4:
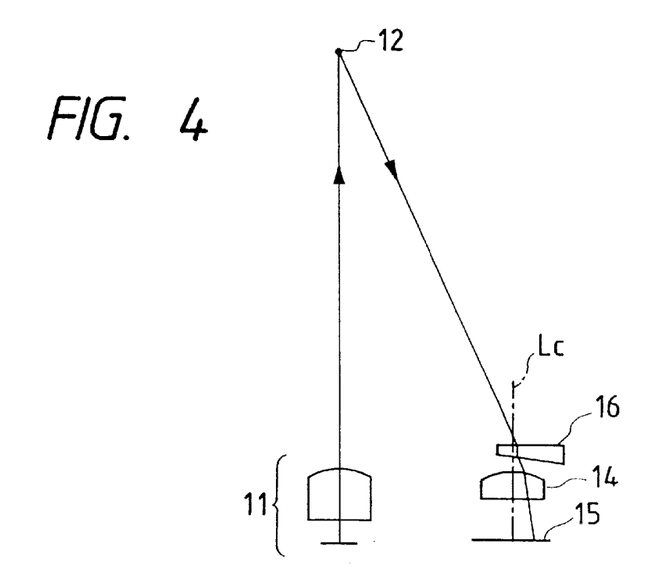
FIG. 4 is a conceptual view showing the arrangement of an autofocus optical system mounted in the camera of a second embodiment in the present invention.

The camera of this embodiment, as shown in FIG. 4, is the same as that of the first embodiment with the exception that a prism 16 constructed of plastic is used instead of the stop 13 of FIG. 3. Specifically, in the camera of the second embodiment, a beam of light emitted from the projecting section 11 is first radiated toward the object point 12. Subsequently, reflected light from the object point 12, after passing through the prism 16, is transmitted through the reception lens 14 and is radiated on the light-receiving element 15. In this case, the position where the light transmitted through the prism 16 is incident on the light-receiving element 15 is set to be exactly the same as in the camera of the first embodiment. Thus, like the camera of the first embodiment, it is possible to detect the shift of the imaging position of the photographing optical system which is caused by the ambient temperature or humidity change, and the correction of the shift of the imaging position brings about good photography.

Also, the prism 16 may be placed between the reception lens 14 and the light-receiving element 15 or may also be constructed integral with the reception lens 14.

In the camera of the second embodiment also, where the photographing optical system has a zoom function and is such that the imaging position on the wide-angle side is different from that on the telephoto side, the prism 16 is decentered in the range from the wide-angle side to the telephoto side so that the amount of variation of data for range measurement can be held with accuracy. By doing so, it becomes possible to solve this problem.

Third Embodiment

Figure 5:
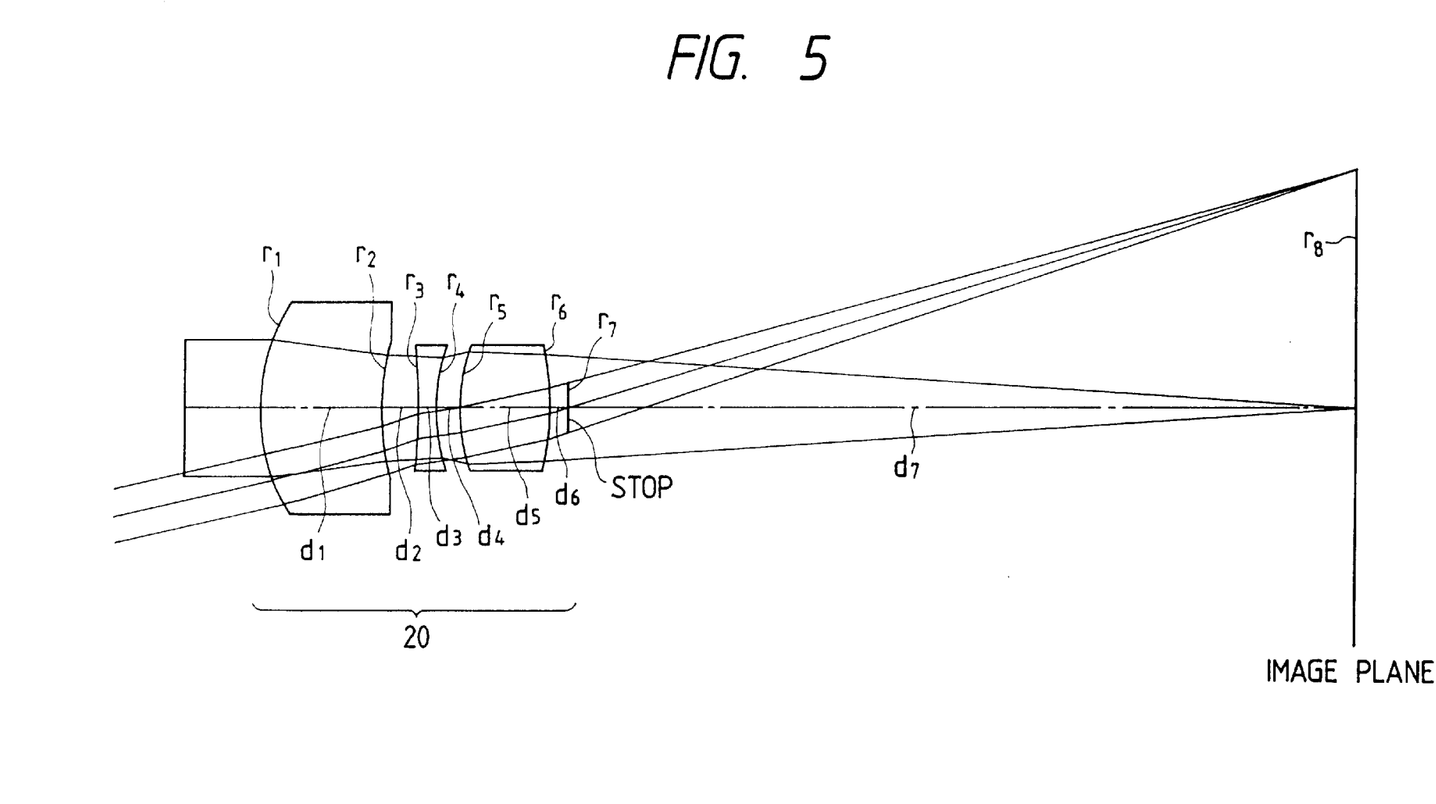
FIG. 5 is a sectional view showing the arrangement, developed along the optical axis, of a photographing optical system used in the camera of a third embodiment in the present invention.

FIG. 5 shows the arrangement of the photographing optical system used in the camera of this embodiment. A photographing optical system 20 is set, with an imaging position at 20° C. as a reference, so that the imaging position is shifted from the reference position by −1.6 mm at 50° C. and by +1.4 mm at −10° C.

The following are the numerical data of optical elements constituting the photographing optical system 20.

Focal length $f_1$ of the photographing optical system 20 = 153.92 (mm)
F number of the photographing optical system 20 = 8.0

| | | | |
|---|---|---|---|
| $r_1 = 27.884$ | $d_1 = 17.9$ | $n_1 = 1.49241$ | $\nu_1 = 57.66$ |
| $r_2 = 37.536$ (aspherical) | $d_2 = 5.2$ | | |
| $r_3 = -165.582$ | $d_3 = 2.9$ | $n_3 = 1.58423$ | $\nu_3 = 30.49$ |
| $r_4 = 23.742$ | $d_4 = 3.2$ | | |
| $r_5 = 25.632$ | $d_5 = 12.9$ | $n_5 = 1.50137$ | $\nu_5 = 56.40$ |
| $r_6 = -81.780$ (aspherical) | $d_6 = 2.9$ | | |
| $r_7 = \infty$ (stop) | $d_7 = 115.841$ | | |
| $r_8 = \infty$ (image plane) | | | |

Conic constants and aspherical coefficients

Figure 6:
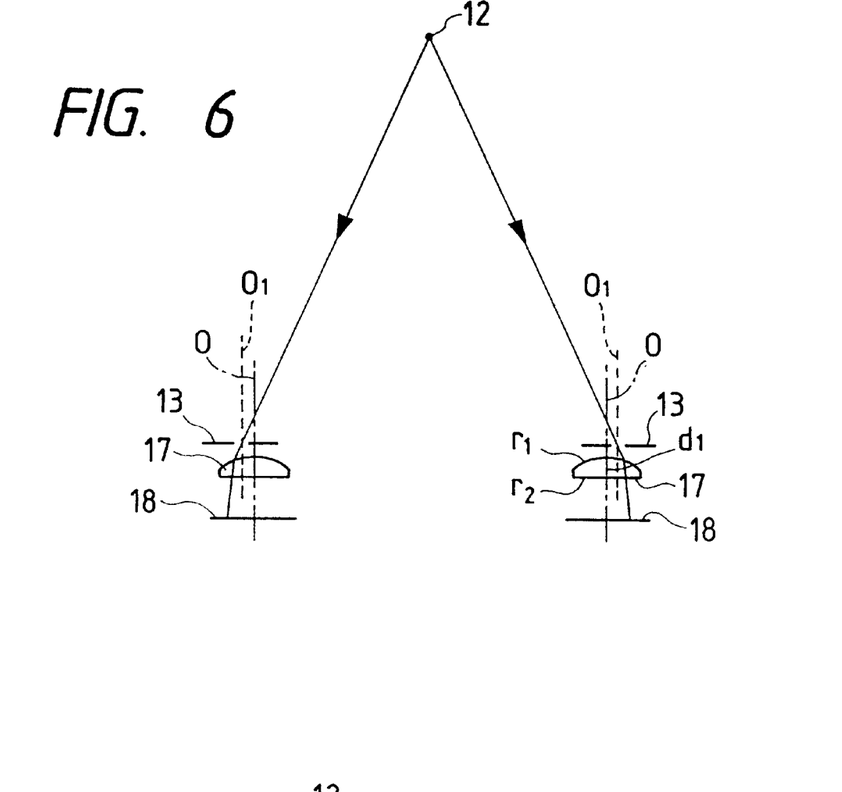
FIG. 6 is a conceptual view showing the arrangement of a bilateral reception optical system of a passive autofocus optical system mounted in the camera of the third embodiment.

Second surface $K = 0.519$
$E = 3.8181 \times 10^{-6}$,   $F = -1.7258 \times 10^{-9}$,
$G = 8.5237 \times 10^{-13}$,   $H = -1.1266 \times 10^{-15}$,
$I = -3.3069 \times 10^{-18}$ Sixth surface $K = -23.068$
$E = -6.5220 \times 10^{-7}$,   $F = 5.3288 \times 10^{-9}$,
$G = 1.3385 \times 10^{-13}$,   $H = 1.2833 \times 10^{-18}$,
$I = -4.0041 \times 10^{-23}$ The autofocus optical system mounted in the camera of the third embodiment includes a passive autofocus optical system. FIG. 6 shows the arrangement of the bilateral reception optical system of the passive autofocus optical system. Also, the arrangement of the projecting section, which is the same as in the first embodiment, is omitted here. The bilateral reception optical system, as shown in the figure, is such that each beam of light from the object point 12, after passing through the aperture of the stop 13, is transmitted through a reception lens 17 and is received by a light-receiving element 18. The reception lens 17 is made from plastic material, and a center $0_1$ of the aperture of the stop 13 is shifted from a center 0 of the reception lens 17 by 3 mm in a horizontal direction (in a direction normal to the optical axis of the reception lens 17). Also, a distance between two reception lenses 17 is 60 mm.

The numerical data of the reception lens 17 is shown below.

Focal length $f_2$ of the reception lens 17 = 16 mm
Thermal linear expansion coefficient of the reception lens 17 = 7.1 × 10$^{-5}$

| | | |
|---|---|---|
| $r_1 = 9.0958$ (aspherical) | $d_1 = 5.7$ | $n_1 = 1.4924(20° C.)$, |
| $r_2 = 41.621$ | | 1.4886(50° C.), |
| | | 1.4964(−10° C.) |

Conic constant and aspherical coefficients

First surface $K = -1.1714$
$E = 6.6219 \times 10^{-5}$,   $F = -2.6529 \times 10^{-7}$ The bilateral reception optical system of the autofocus optical system mounted in the camera of the third embodiment is constructed as mentioned above, and thus, for the angle of incidence of each ray of light from the object point 12 through the center of the aperture of the stop 13 on the reception lens 17, the angle of emergence of the ray passing through the center of stop 13 and the reception lens 17 and emerging from the reception lens 17 varies according to the ambient temperature or humidity change, and thus the position of the ray incident on the light-receiving element 18 also varies. In accordance with the amount of variation of the incidence position of each ray which is detected at the light-receiving element 18, the shift of the imaging position of the photographing optical system 20 is corrected to secure good photography.

Also, in this autofocus optical system, the distance to the object point 12 which measures 3 m at 20° C. becomes 3.75 m at 50° C. and 2.5 m at −10° C. Each of these values corresponds to the amount of variation of the focal length, caused by the temperature change, of the photographing optical system 20, and it becomes possible that the shift of the imaging position of the photographing optical system is corrected on the basis of such data for range measurement.

Where the photographing optical system 20 has a zoom function and is such that the imaging position on the wide-angle side is different from that on the telephoto side, the amount of eccentricity of the center $0_1$ of the aperture of the stop 13 regarding the center 0 of the reception lens 17 is changed in the range from the wide-angle side to the telephoto side so that the amount of variation of data for range measurement can be held with accuracy. By doing so, it becomes possible to meet this problem.

In the above numerical data, $r_1$, $r_2$, . . . represent radii of curvature or individual lens surfaces; $d_1$, $d_2$, . . . thicknesses of individual lenses or spaces therebetween; $n_1$, $n_2$, . . . refractive indices of individual lenses (corresponding to light with a wavelength of 587.56 nm; and $\nu_1$, $\nu_2$, . . . Abbe's numbers of individual lenses.

Also, the configuration of each aspherical surface is expressed by the following equation:

$$X = \frac{CY^2}{1 + \sqrt{1 - KC^2Y^2}} + EY^4 + FY^6 + GY^8 + HY^{10} + IY^{12}$$

where X is the coordinate in the direction of the optical axis, Y is the coordinate in the direction normal to the optical axis, C is a curvature (1/r) at the vertex of the aspherical surface, K is a conic constant, and E, F, G, H, and I are aspherical coefficients.

Fourth Embodiment

Figure 7:
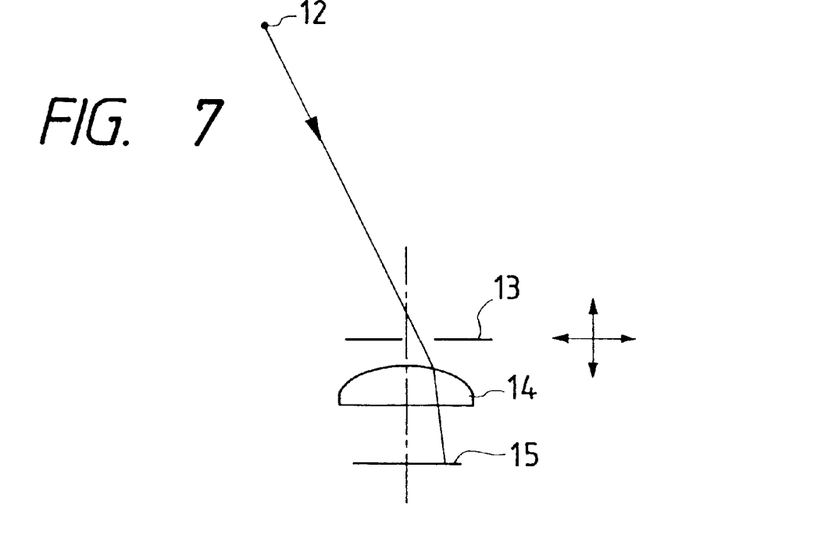
FIG. 7 is a conceptual view showing an arrangement of a reception optical system of an autofocus optical system mounted in the camera of a fourth embodiment in the present invention.

The camera of this embodiment is equipped with a photographing optical system constructed with a zoom lens unit. The reception optical system of the autofocus optical system shown in FIG. 7 is an example suitable for use in the photographing optical system having the variable magnification function. The arrangement of the reception optical system is substantially the same as in the first embodiment with the exception that the stop 13 can be decentered and moved in a lateral or longitudinal direction (in the directions of arrows of the figure). Where the photographing optical system of the camera is constructed with a zoom lens unit, the amount of variation of the Imaging position due to the temperature or humidity change may have the difference between the wide-angle position and the telephoto position. In this photographing optical system, therefore, when the magnification is changed in the range from the wide-angle position to the telephoto position, the stop 13 of the reception optical system is decentered and moved in a lateral or longitudinal direction in association with the magnification change. In this way, the shift of the imaging position of the photographing optical system can be accurately detected and corrected.

Figure 8:
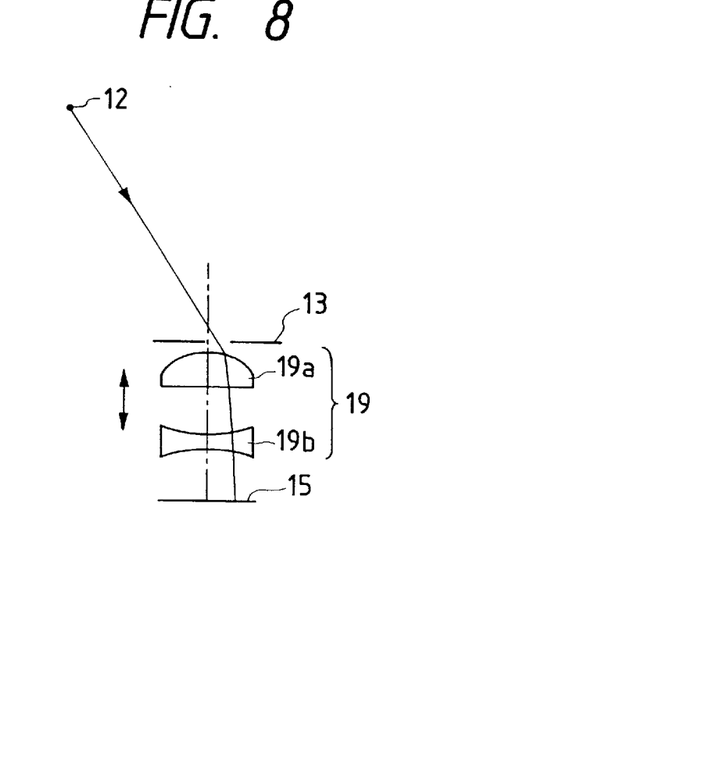
FIG. 8 is a conceptual view showing another arrangement of the reception optical system of the autofocus optical system mounted in the camera of the fourth embodiment.

The reception optical system of the autofocus optical system, as shown in FIG. 8, may be designed to interpose a reception lens system 19 including a first lens unit 19a and a second lens unit 19b between the stop 13 and the light-receiving element 15. In this case, when the magnification is changed from the wide-angle position to the telephoto position of the photographing optical system, the stop 13, instead of being decentered and moved in the lateral and longitudinal directions as indicated by the arrows in FIG. 7, is decentered and fixed as shown in FIG. 8, and the first lens unit 19a or the second lens unit 19b of the reception lens system 19 is moved along the optical axis of the reception lens system 19 to thereby detect the shift of the imaging position of the photographing optical system.

Fifth Embodiment

Figure 9A:
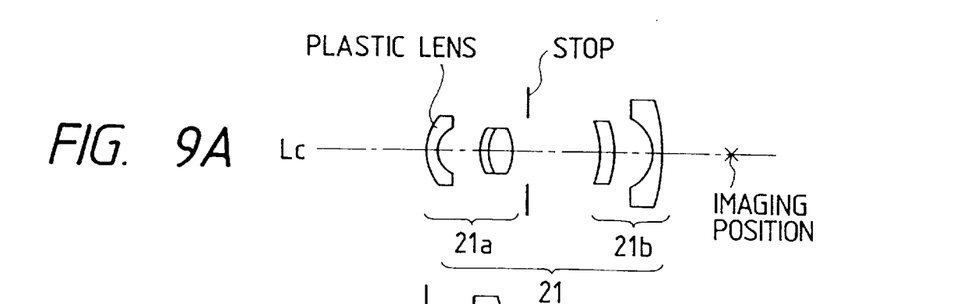
FIGS. 9A and 9B are sectional views showing arrangements, developed along the optical axis at wide-angle and telephoto positions, respectively, of a photographing optical system used in the camera of a fifth embodiment in the present invention.
Figure 9B:
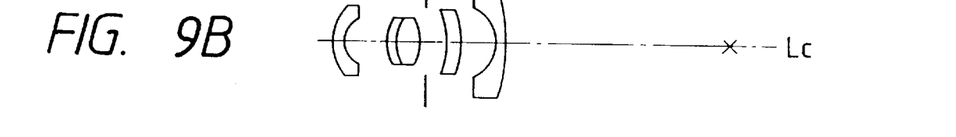
Figure 10:
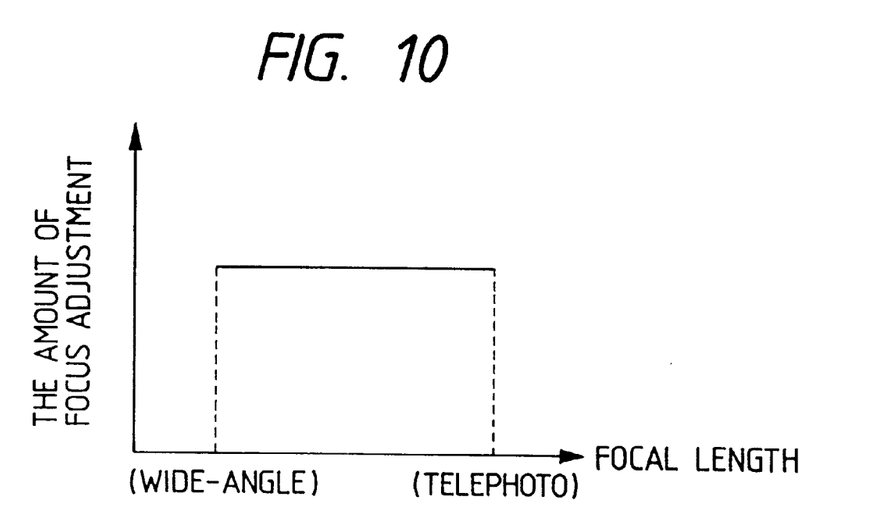
FIG. 10 is a graph showing the relationship between the focal length when magnification is changed and the amount of focus adjustment in the photographing optical system of the camera of the fifth embodiment.

As shown in FIGS. 9A and 9B, a photographing optical system 21 used in the camera of this embodiment is composed of a front lens unit 21a and a rear lens unit 21b, which are moved along the optical axis Lc to change the magnification. This photographing optical system 21 uses a plastic lens which is situated closer to an object in the front lens unit 21a. In this way, when the plastic lens is used in the photographing optical system 21 having a variable magnification function, the amount of variation of the imaging position caused by an ambient temperature change is proportional to the square of the longitudinal magnification of an image formed by the rear lens unit 21b. Since, however, the entire focal length of the photographing optical system 21 varies in proportion to the square of the longitudinal magnification of the image formed by the rear lens unit 21b, a substantial amount of focus adjustment regarding the focal length of the photographing optical system 21 becomes constant in the range from the wide-angle position to the telephoto position, irrespective of the focal length of the optical system (refer to FIG. 10).

Hence, it is desirable that, for the autofocus optical system used in the camera of the fifth embodiment, the optical system of the fourth embodiment shown in FIGS. 7 or 8 is used which is suitable for the photographing optical system equipped with the zoom lens system. Thus, it is only necessary that such an autofocus optical system is used to detect the amount of variation of the imaging position on the telephoto side of the photographing optical system 21 and then, based on the data of the variation, the shift of the imaging position of the photographing optical system 21 is corrected.

Sixth Embodiment

Figure 11:
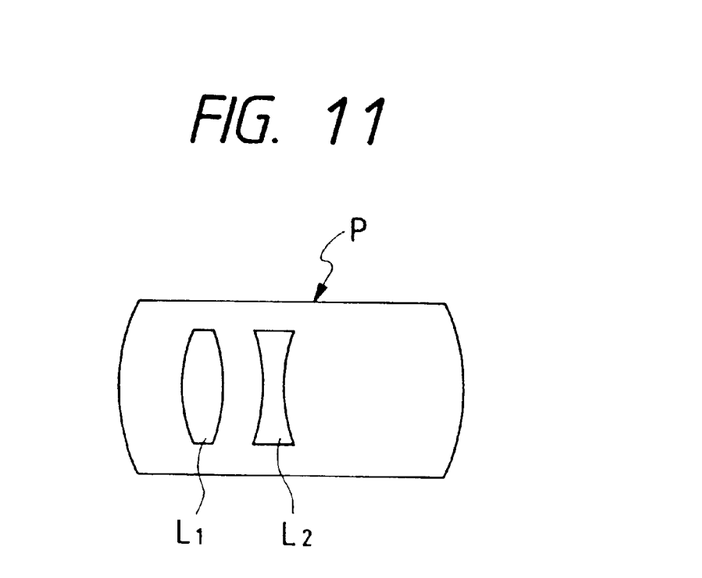
FIG. 11 is a conceptual view for explaining the arrangement of a photographing optical system used in the camera of a sixth embodiment in the present invention.
Figure 12:
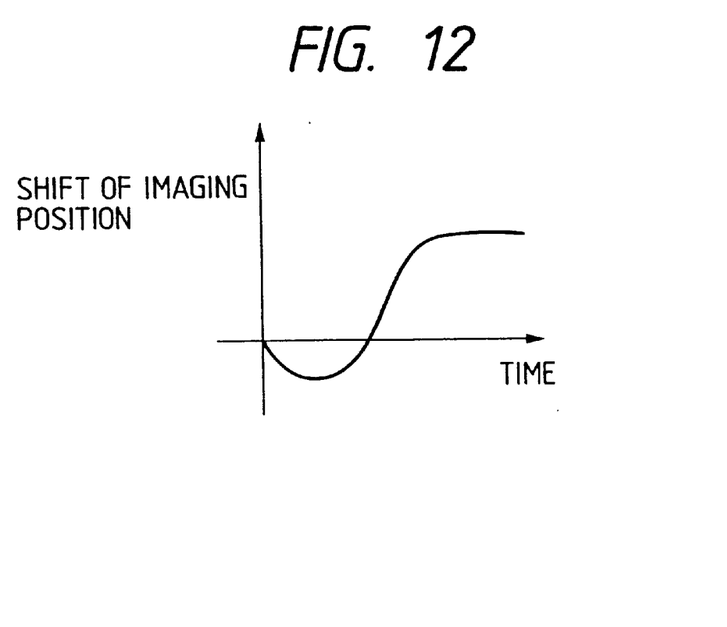
FIG. 12 is a graph for explaining the dependence of the shift of the imaging position involved in a temperature or humidity change in the photographing optical system of the camera of the sixth embodiment as a function of time.

The photographing optical system of the camera is not necessarily constructed with lenses of identical materials. For example, as illustrated in FIG. 11, a case is known where a photographing optical system P includes two kinds of lenses $L_1$ and $L_2$ made from different materials (acrylic resin and polycarbonate resin). In such a photographing optical system, the rate of variation of the focal length of each lens varies with lens material. Thus, as shown in FIG. 12, the amount of variation of the imaging position, due to the passage of time, of the photographing optical system sometimes does not always become constant. The sixth embodiment provides the autofocus optical system which can be mounted in the camera equipped with the above photographing optical system.

Figure 13:
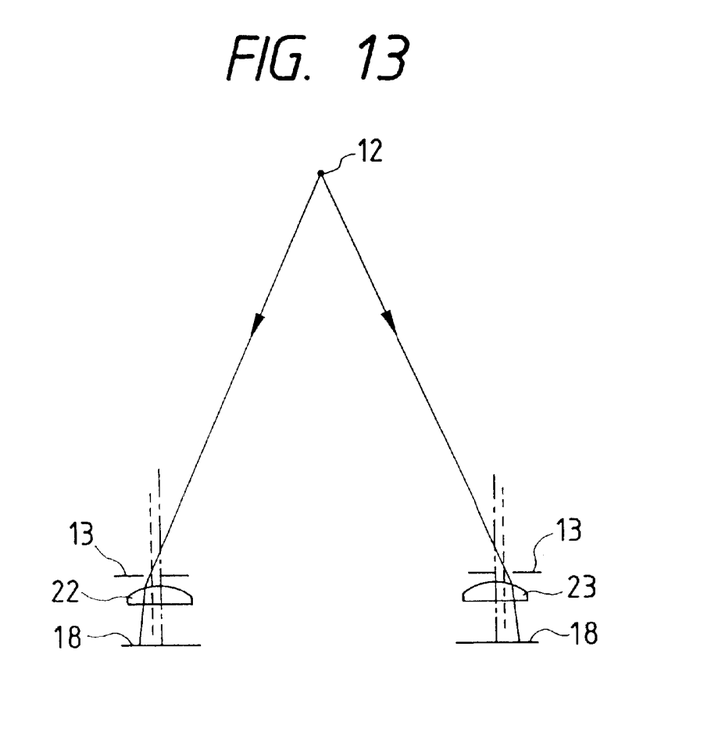
FIG. 13 is a conceptual view showing an arrangement of a bilateral reception optical system of an autofocus optical system mounted in the camera of the sixth embodiment.

FIG. 13 shows a passive autofocus optical system used in the camera of the sixth embodiment. The bilateral reception optical system of this autofocus optical system, as shown in the figure, has a reception lens 22 constructed of polycarbonate resin and a reception lens 23 of acrylic resin. Beams of light emanating from the object 12, after passing through the apertures of the stops 13, are transmitted through the reception lenses 22 and 23 and are received by the light-receiving elements 18. In this case, the amount of eccentricity of the center of the aperture of each stop 13 regarding the center of each of the reception lenses 22 and 23 is the same as in the third embodiment.

Thus in the photographing optical system, the amount of variation of the imaging position produced by the lens $L_2$ of polycarbonate resin is detected on the side of the reception lens 22 of the bilateral reception system, while the amount of variation of the imaging position by the lens $L_1$ of acrylic resin is detected on the side of the reception lens 23. Consequently, the amount of variation of the imaging position of the photographing optical system can be accurately held.

Figure 14:
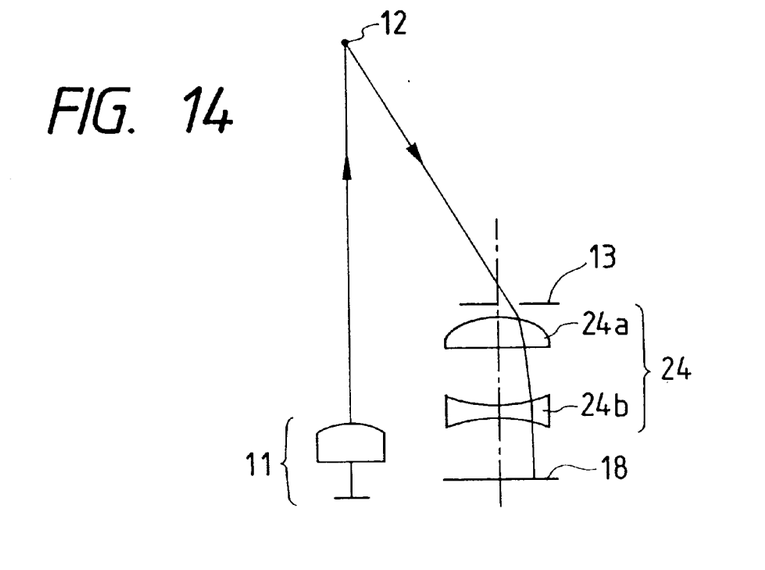
FIG. 14 is a conceptual view showing another to:. arrangement of a reception optical system of the autofocus optical system mounted in the camera of the sixth embodiment.

On the other hand, where an active autofocus optical system is mounted in the camera, as shown in FIG. 14, the autofocus optical system is designed so that a reception lens system 24 includes a lens unit 24a constructed of acrylic resin and a lens unit 24b of polycarbonate resin. The same effect as in the autofocus optical system shown in FIG. 13 can thus be secured.

Here, if a coating is applied to the synthetic resin lens, changes in refracting power and shape by a humidity change will differ in time. Thus, as in each embodiment mentioned above, where data for range measurement is corrected in accordance with the change in the refracting power of each reception lens constituting the reception optical system of the autofocus optical system and then the shift of the imaging position of the photographing optical system is corrected, the coating of the same material as in each synthetic resin lens included in the photographing optical system is applied to the reception lens to make correction with accuracy. In this way, it is favorable to correct the difference in hygroscopic rate between the reception lens and the lens in the photographing optical system.

Seventh Embodiment

Figure 15:
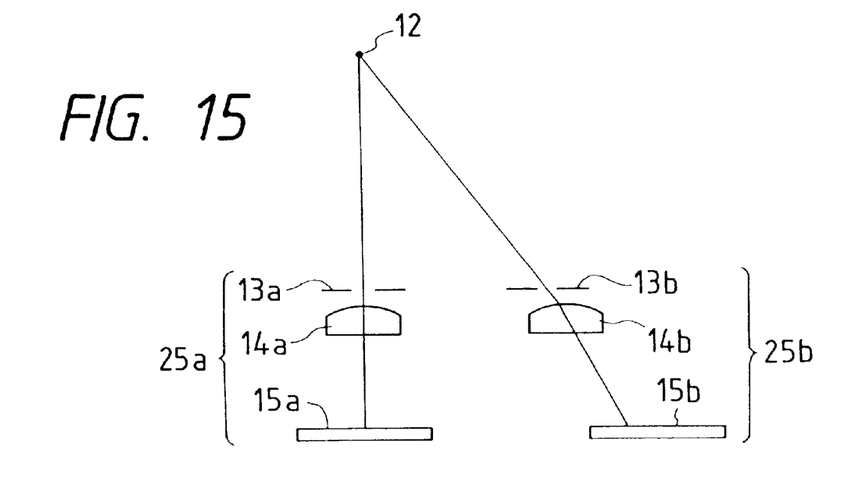
FIG. 15 is a conceptual view showing the arrangement of a bilateral reception optical system of an autofocus optical system mounted in the camera of a seventh embodiment in the present invention.

In this embodiment, a bilateral reception optical system shown in FIG. 15 includes a light-receiving section 25a and a light-receiving section 25b. The light-receiving section 25a has a stop 13a, a reception lens 14a, and a light-receiving element 15a. The stop 13a and the reception lens 14a are aligned with each other. The light-receiving section 15b, on the other hand, has a stop 13b, a reception lens 14b, and a light-receiving element 15b. The aperture of the stop 13b is decentered with respect to the reception lens 14b. The reception lens 14a has no coating, and the amount of eccentricity of the center of the aperture of the stop 13b regarding the center of the reception lens 14b depends on the magnification change of the photographing optical system.

Although the function and effect of the seventh embodiment are substantially the same as in the camera of each embodiment mentioned above, the bilateral reception optical system of the autofocus optical system is constructed with two light-receiving sections, and thus the shift of the imaging position of the photographing optical system is found by the difference in output between the light-receiving elements 15a and 15b. Consequently, data for range measurement can be extracted more accurately. Furthermore, since the light-receiving section on only one side of the bilateral reception optical system has the coating and a stop driving system, a highly accurate range measurement can be made at lower cost and more favorable photography becomes possible.

What is claimed is:

1. A camera having an autofocus function comprising:
   a photographing optical system including synthetic resin lenses; and
   an autofocus optical system which is separate from said photographing optical system,
   wherein said autofocus optical system includes a first optical unit having at least one synthetic resin lens and a stop,
   said stop defining a central axis and being disposed such that said central axis is displaced a distance in a direction perpendicular to an optical axis of at least one of said synthetic resin lenses so that shift of an image position of said photographing optical system caused by change in temperature and humidity is compensated by said autofocus optical system,
   wherein said photographing optical system has at least two kinds of synthetic resin lenses, and said autofocus optical system is a passive autofocus optical system and further includes a second optical unit having at least one synthetic resin lens and a stop, said first optical unit and said second optical unit forming a bilateral optical system, a material of the synthetic resin lens in said first optical unit being different from a material of the synthetic resin lens in said second optical unit.

2. A camera having an autofocus function according to claim 1, wherein the synthetic resin lens in said first optical unit has a same property in reacting to the change in temperature and humidity as that of one of said at least two kinds of synthetic resin lenses in said photographing optical system, and the synthetic resin lens in said second optical unit has a same property in reacting to the change in temperature and humidity as that of another of said two kinds of synthetic resin lenses in said photographing optical system.

3. A camera having an autofocus function comprising:
   a photographing optical system including synthetic resin lenses; and
   an autofocus optical system which is separate from said photographing optical system,
   wherein said autofocus optical system includes a first optical unit having at least one synthetic resin lens and a stop,
   said stop defining a central axis and being disposed such that said central axis is displaced a distance in a direction perpendicular to an optical axis of at least one of said synthetic resin lenses so that shift of an image position of said photographing optical system caused by change in temperature and humidity is compensated by said autofocus optical system,
   wherein said photographing optical system has at least two kinds of synthetic resin lenses, and said autofocus optical system is an active autofocus optical system in which said first optical unit acts as a reception optical system, said reception optical system including at least two kinds of synthetic resin lenses.

4. A camera having an autofocus function according to claim 3, wherein said at least two kinds of synthetic resin lenses in said photographing optical system have same properties in reacting to the change in temperature and humidity as those of the synthetic resin lenses included in said reception system.

5. A camera having an autofocus function comprising:
   a photographing optical system including synthetic resin lenses; and
   an autofocus optical system which is separate from said photographing optical system,
   wherein said autofocus optical system includes a first optical unit having at least one synthetic resin lens and a stop,
   said stop defining a central axis and being disposed such that said central axis is displaced a distance in a direction perpendicular to an optical axis of at least one of said synthetic resin lenses so that shift of an image position of said photographing optical system caused by change in temperature and humidity is compensated by said autofocus optical system,
   wherein surfaces of the synthetic resin lenses included in said photographing optical system and said autofocus optical system have coatings.

6. A camera having an autofocus function according to claim 5, wherein a material of the coatings of said surfaces of the synthetic resin lenses in said autofocus optical system is the same material as a material of the coatings of said surfaces of the synthetic resin lenses in said photographing optical system.

7. A camera having an autofocus function comprising:
   a photographing optical system including synthetic resin lenses; and
   an autofocus optical system which is separate from said photographing optical system,
   wherein said autofocus optical system includes a first optical unit having at least one synthetic resin lens and a stop,
   said stop defining a central axis and being disposed such that said central axis is displaced a distance in a direction perpendicular to an optical axis of at least one of said synthetic resin lenses so that shift of an image position of said photographing optical system caused by change in temperature and humidity is compensated by said autofocus optical system,
   wherein said autofocus optical system is a passive autofocus optical system and further includes a second optical unit having at least one synthetic resin lens and a stop, said first optical unit and said second optical unit forming a bilateral reception optical system, said stop in said second optical unit being aligned with the synthetic resin lens in said second optical unit.

8. A camera having an autofocus function comprising:
   a photographing optical system including synthetic resin lenses; and
   an autofocus optical system which is separate from said photographing optical system,
   wherein said autofocus optical system includes a first optical unit having at least one synthetic resin lens and a stop,
   said stop defining a central axis and being disposed such that said central axis is displaced a distance in a direction perpendicular to an optical axis of at least one of said synthetic resin lenses so that shift of an image position of said photographing optical system caused by change in temperature and humidity is compensated by said autofocus optical system, wherein the synthetic resin lenses in said photographing optical system have a same property in reacting to the change in temperature and humidity as that of the synthetic resin lens in said autofocus optical system.

9. A camera having an autofocus function comprising:

a photographing optical system having synthetic resin lenses; and an autofocus optical system which is separate from said photographing optical system, wherein said autofocus optical system includes:
  at least one synthetic resin lens; and
  an optical member which deflects a path of light rays and which is made of a synthetic resin and
  wherein said optical member has an entrance surface and an exit surface constructed and arranged such that any ray incident on said entrance surface and emergent from said exit surface has an angle of emergence at said exit surface different from an angle of incidence at said entrance surface.

10. A camera having an autofocus function according to claim 9, wherein said autofocus optical system is a passive autofocus optical system, with the synthetic resin lens of said autofocus optical system and said optical member being arranged in a reception optical system of said passive autofocus optical system.

11. A camera having an autofocus function according to claim 10 wherein said optical member is a prism.

12. A camera having an autofocus function according to claim 9, wherein said autofocus optical system is an active autofocus optical system, with the synthetic resin lens of said autofocus optical system and said optical member being arranged in a reception optical system of said active autofocus optical system.

13. A camera having an autofocus function according to claim 12, wherein said optical member is a prism.

14. A camera having an autofocus function according to claim 9, wherein effective surfaces of said optical member consist of light transmitting surfaces.

15. A camera having an autofocus function comprising:

a photographing optical system having synthetic resin lenses; and an autofocus optical system which is separate from said photographing optical system, wherein said autofocus optical system includes:
  at least one synthetic resin lens; and
  an optical member which deflects a path of light rays and which is made of a synthetic resin, and
  wherein effective surfaces of said optical member consist of light transmitting surfaces at least one of which is obliquely disposed with respect to a central axis of said at least one synthetic resin lens.

16. A camera having an autofocus function comprising:

a photographing optical system having synthetic resin lenses; and an autofocus optical system which is separate from said photographing optical system, wherein said autofocus optical system includes:
  at least one synthetic resin lens; and
  an optical member which deflects a path of light rays and which is made of a synthetic resin,
  wherein said optical member is provided with a light transmitting surface that is obliquely disposed with respect to a central axis of said at least one synthetic resin lens, and
  wherein said at least one synthetic resin lens and said optical member substantially oppose one another.

17. A camera having an autofocus function according to claim 16, wherein effective surfaces of said optical member consist of light transmitting surfaces.

* * * * *